Patented Jan. 28, 1936 2,029,025

UNITED STATES PATENT OFFICE 2,029,025

METHOD OF FREEZING ICE CREAM AND FORMULA THEREFOR

Clarence I. Justheim, Salt Lake City, Utah

No Drawing. Application March 1, 1934, Serial No. 713,525

5 Claims. (Cl. 99—11)

My invention relates to freezing of foods and confections and has for its object to provide a new and efficient method of freezing ice cream or similar products into a creamy texture, smoothly mixed frozen confection, in a period of time not more than four minutes.

A further object is to provide a new method of freezing ice cream into a frozen confection without the use of any equipment or special dishes or freezers.

A still further object is to provide a method of freezing semi-liquids and heavier types of liquids into semi-solids in a short period of time without any expensive machinery, freezers, or other paraphernalia and which confection liquid or other material so frozen will keep for a long period of time without melting to a liquid again, this period of time being longer than the time obtained for ordinary frozen confections, such as ice cream or sherbets.

A still further object is to provide a formula for making ice cream which formula takes less time and less expense and comprises mixing the ingredients into a smoother, quicker freezing, tastier confection than is obtained by the so-called instant frozen methods now employed by the ice cream manufacturers.

These objects I accomplish with the following formula and method of mixing and treating the cream, liquid or fluid.

To make ice cream with the best method, with the proper formula to make it freeze almost instantly, and with a smooth consistency, I use the following formula for making the cream:

Powdered egg, gelatine, powdered skim milk, cream, sugar and flavoring. The percentage of these ingredients may be varied in proportion desired. A good texture of ice cream may be made with cream, gelatine and sugar, with any desired flavoring. The making of the ice cream depends entirely upon the use of the gelatine and the method of freezing which I use. The above ingredients may be mixed and then the following method of freezing employed:

When this mixture has been thoroughly mixed and is ready for freezing I place it in a suitable round bottomed dish and then I take a small piece of solid carbon dioxide, known as dry ice, and thoroughly pulverize this ice into a suitable bag or vessel, leaving no large particles of the ice but making carbon dioxide snow out of the ice. I then add small amounts of this snow to the formula above set forth, constantly stirring the mixture, mixing the snow thoroughly into the mixture by quick slicing motions of the mixing spoon or ladle. This snow freezes the mixture in a remarkably short time, at the same time giving off a vapor similar in appearance to steam, but which is merely the sublimation of the solid carbon dioxide, from the mixture. As this gas escapes the mixture is frozen into a semi-solid edible confection with a smoother texture than obtainable any other way.

The reason for powdering the carbon dioxide is to allow or provide a greater surface for contact with the fluid and from which a greater volume of gas escapes in the same period of time than when solid carbon dioxide is used, thus creating quicker and smoother freezing. Solid carbon dioxide may be used, but the method is slower and more expensive, as more solid carbon dioxide is required to freeze an equal amount of fluid.

This invention consists mainly in the method of freezing the gelatine filled cream into an instantaneously frozen smooth ice cream, but other liquids which have a body may be employed in a like manner to make frozen confections, and applicant does not limit himself to the freezing of the above formula only, as other like formulæ for making ice cream or sherbets may be used but most of them take longer to freeze.

Such changes and modifications of the formula are deemed within the spirit of the invention and the scope of the claims.

Having thus described my invention I desire to secure by Letters Patent and claim:—

1. A method of making a frozen confection comprising combining powdered gelatine, powdered egg, powdered skim milk, cream, sugar, flavoring and mixing the entire formula by quick stirring motions with powdered solid carbon dioxide.

2. A method of freezing ice cream comprising mixing any desirable fluid with solid carbon dioxide in the powdered form and then quickly stirring the solution until frozen.

3. A method of making edible frozen victuals comprising mixing solid carbon dioxide in the powdered form with the victual to produce a frozen semi-solid victual.

4. A method of freezing ice cream, comprising mixing any desired ice cream mixture with solid carbon dioxide which has been previously powdered and then stirring the mixture quickly to completely distribute the powdered solid carbon dioxide throughout the mixture and cause the mixture to freeze.

5. A method of making ice cream which comprises mixing any desired ice cream mixture, powdering solid carbon dioxide to a very fine powder, adding the powdered solid carbon dioxide to the formula and simultaneously stirring the mixture until frozen.

CLARENCE I. JUSTHEIM.